US009855706B2

(12) United States Patent
Din et al.

(10) Patent No.: US 9,855,706 B2
(45) Date of Patent: Jan. 2, 2018

(54) THREE DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Ming-Chih Huang, New Taipei (TW); Chien-Ying Tseng, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 151 days.

(21) Appl. No.: 14/700,155

(22) Filed: Apr. 30, 2015

(65) Prior Publication Data

US 2016/0221263 A1 Aug. 4, 2016

(30) Foreign Application Priority Data

Feb. 4, 2015 (CN) .......................... 2015 1 0057888

(51) Int. Cl.
*B29C 67/00* (2017.01)
*B28B 1/00* (2006.01)
(Continued)

(52) U.S. Cl.
CPC ............ *B29C 67/0074* (2013.01); *B22F 3/03* (2013.01); *B28B 1/001* (2013.01); *B29C 64/218* (2017.08);
(Continued)

(58) Field of Classification Search
CPC ............ B29C 67/0081; B29C 67/0074; B29C 67/0085; B29C 67/0096; B29C 64/218;
(Continued)

(56) References Cited

U.S. PATENT DOCUMENTS 5,204,055 A 4/1993 Sachs et al.
5,340,656 A 8/1994 Sachs et al.
(Continued)

FOREIGN PATENT DOCUMENTS

CN 1494082 5/2004
DK WO 2014044676 A1 * 3/2014 ......... B29C 67/0077
(Continued)

OTHER PUBLICATIONS

"Office Action of Europe Counterpart Application", dated Jun. 27, 2016, p. 1-p. 7.
(Continued)

*Primary Examiner* — Alison L Hindenlang
*Assistant Examiner* — Jerzi H Moreno Hernandez
(74) *Attorney, Agent, or Firm* — JCIPRNET

(57) ABSTRACT

A 3-D printing apparatus including a base and a printing head module is provided. The base includes a first supplying platform, a printing bed and a second supplying platform disposed in order along a printing path. The first supplying platform and the second supplying platform carry building powder respectively; the first supplying platform and the second supplying platform are alternately lifted to a printing-reference plane of the base for supplying the building powder to the printing bed. The printing head module is movably disposed above the base and configured to move along a forward direction of the print path to transfer the building powder of the first supplying platform onto the printing bed, and move along a backward direction of the printing path to transfer building powder of the second
(Continued)

supplying platform onto the printing bed to form bonded powder layers stacked together to form a 3-D object.

7 Claims, 5 Drawing Sheets

(51) Int. Cl.
| | | |
|---|---|---|
| *B22F 3/03* | (2006.01) | |
| *B33Y 30/00* | (2015.01) | |
| *B29C 64/218* | (2017.01) | |
| *B33Y 40/00* | (2015.01) | |
| *B29K 101/00* | (2006.01) | |
| *B29K 105/00* | (2006.01) | |
| *B22F 3/105* | (2006.01) | |
| *B29C 64/20* | (2017.01) | |
| *B29C 64/165* | (2017.01) | |
| *B29C 64/153* | (2017.01) | |

(52) U.S. Cl.
CPC ...... *B29C 67/0081* (2013.01); *B29C 67/0085* (2013.01); *B29C 67/0096* (2013.01); *B33Y 30/00* (2014.12); *B22F 2003/1056* (2013.01); *B22F 2003/1059* (2013.01); *B29C 64/153* (2017.08); *B29C 64/165* (2017.08); *B29C 64/20* (2017.08); *B29K 2101/00* (2013.01); *B29K 2105/251* (2013.01); *B33Y 40/00* (2014.12)

(58) Field of Classification Search
CPC ..... B29C 64/20; B29C 64/153; B29C 64/165; B28B 1/001; B33Y 10/00; B33Y 30/00; B33Y 40/00; B22F 2003/1056; B22F 2003/1059; B22F 3/03; B29K 2105/251; B29K 2101/00

See application file for complete search history.

(56) References Cited

U.S. PATENT DOCUMENTS

| | | | |
|---|---|---|---|
| 5,902,441 A | 5/1999 | Bredt et al. | |
| 6,008,318 A | 12/1999 | Zhao et al. | |
| 6,375,874 B1 | 4/2002 | Russell et al. | |
| 6,764,636 B1* | 7/2004 | Allanic | B29C 41/12 118/100 |
| 6,799,959 B1* | 10/2004 | Tochimoto | B29C 41/12 425/130 |
| 6,989,115 B2 | 1/2006 | Russell et al. | |
| 2001/0050448 A1* | 12/2001 | Kubo | B29C 67/0077 264/308 |
| 2002/0079601 A1* | 6/2002 | Russell | B29C 41/12 264/40.1 |
| 2002/0105114 A1* | 8/2002 | Kubo | B29C 67/0077 264/497 |
| 2005/0104241 A1* | 5/2005 | Kritchman | B29C 67/0059 264/40.1 |
| 2005/0225007 A1 | 10/2005 | Lai | |
| 2006/0099287 A1* | 5/2006 | Kim | B33Y 30/00 425/174.4 |
| 2006/0118532 A1 | 6/2006 | Chung et al. | |
| 2007/0298182 A1* | 12/2007 | Perret | B22F 3/1055 427/427.3 |
| 2008/0018018 A1* | 1/2008 | Nielsen | B29C 67/0081 264/308 |
| 2008/0230414 A1* | 9/2008 | Perret | B29C 67/0077 206/349 |
| 2010/0121476 A1* | 5/2010 | Kritchman | B29C 67/0051 700/119 |
| 2010/0247742 A1* | 9/2010 | Shi | C23C 24/04 427/8 |
| 2011/0059247 A1* | 3/2011 | Kuzusako | B22C 7/02 427/372.2 |
| 2011/0147993 A1* | 6/2011 | Eshed | B29C 67/0059 264/308 |
| 2011/0190923 A1* | 8/2011 | Matsui | G06F 19/00 700/118 |
| 2012/0156516 A1* | 6/2012 | Matsui | B29C 67/0081 428/515 |
| 2014/0255666 A1 | 9/2014 | Stucker | |
| 2015/0050463 A1* | 2/2015 | Nakano | B33Y 50/02 428/192 |
| 2015/0071809 A1* | 3/2015 | Nordkvist | B22F 1/0014 419/23 |
| 2015/0224712 A1* | 8/2015 | Tjellesen | B29C 67/0077 425/375 |
| 2016/0107387 A1* | 4/2016 | Ooba | B29C 67/0081 264/128 |
| 2016/0311023 A1* | 10/2016 | Schirtzinger | B33Y 10/00 |
| 2017/0203513 A1* | 7/2017 | Chanclon | B29C 67/0081 |

FOREIGN PATENT DOCUMENTS

| | | |
|---|---|---|
| EP | 2305454 | 4/2011 |
| WO | 2011082152 | 7/2011 |

OTHER PUBLICATIONS

"Office Action of China Counterpart Application," dated Sep. 5, 2017, p. 1-p. 8.

\* cited by examiner

THREE DIMENSIONAL PRINTING APPARATUS

CROSS-REFERENCE TO RELATED APPLICATION

This application claims the priority benefit of China application serial no. 201510057888.7, filed on Feb. 4, 2015. The entirety of the above-mentioned patent application is hereby incorporated by reference herein and made a part of this specification.

BACKGROUND

1. Technical Field

The technical field relates to a printing apparatus, and relates particularly to a three dimensional (3-D) printing apparatus.

2. Description of Related Art

Along with advances in computer-aided manufacturing (CAM), the manufacturing industry developed rapid prototyping (RP) which is capable of quickly manufacturing primitive design ideas. 3-D printing namely is a form of rapid prototyping that uses a digital 3-D model as a basis, and is a technology for constructing a 3-D object through a method of stacking a layer by layer, cumulatively. Traditionally, 3-D printing has frequently been used in fields such as mold manufacturing, industrial design or manufacturing of models, and currently is gradually being used to manufacture some products directly. Particularly, some expensive applications (for example, hip-joints or teeth, or some components for aircrafts) already use components printed and formed by this type of technology, indicating the popularity of "3-D Printing" technology.

Taking the technique of forming a 3-D structure through powdered material as an example, this type of 3-D printing technology disseminates a powder layer (for example: powdered ceramic, powdered metal, or powdered plastic) of approximately 100 microns thick on an operating surface, then sprays a bonding material on to the powder by using a specially designed printing head to bond the powder at a particular area into a layer, and then repeatedly executing the above mentioned steps to form each layer of powder layer sequentially, and stacking each layer of powder layer together to form the 3-D object.

The above described technique was originally for facilitating the quick manufacturing of prototypes of 3-D elements. However, many current methods for dispensing powder onto the printing surface use a roller rolling from one end to another end of the printing machine to evenly pave powder of a supplying platform that is originally located on a rolling path of the roller onto the operating surface. After the printing head sprays bonding material onto the printing surface, the roller is required to roll back to the initial position to perform printing of the next layer. Therefore, the 3-D printing efficiency of this technology is still very slow and does not meet quick and high production rate requirements.

SUMMARY

One of exemplary embodiments provides a 3-D printing apparatus that performs bi-directional printing, enhancing the efficiency of 3-D printing.

The 3-D printing apparatus of the disclosure is adapted for printing a 3-D object according to a digital 3-D model. The 3-D printing apparatus includes a base and a printing head module. The base includes a printing bed, a first supplying platform and a second supplying platform disposed along a printing path. The printing bed is disposed between the first supplying platform and the second supplying platform. The first supplying platform and the second supplying platform carry building powders respectively. The first supplying platform and the second supplying platform are alternately lifted to a printing-reference plane of the base for supplying the building powders to the printing bed. The printing head module is disposed above the base and configured to move along a forward direction of the printing path, to transfer the building powder of the first supplying platform onto the printing bed, and move along a backward direction of the printing path to transfer the building powder of the second supplying platform onto the printing bed, to sequentially form bonded powder layers stacked on top of each other to form the 3-D object.

Based on the above, in the present disclosure, a base of a 3-D printing apparatus has a first supplying platform and a second supplying platform disposed at two opposite sides of a printing bed, in which the first supplying platform and the second supplying platform are alternately lifted to a printing-reference plane to alternately supplying building powder to the printing bed. In addition, the disclosure further performs printing through a printing head module including two paving rollers cooperating with one printing head or one paving roller cooperating with two printing heads.

By this arrangement, when the printing head module moves along a forward direction of a printing path, building powder of the first supplying platform may be transferred onto the printing bed through the paving roller of the printing head module, the printing head then dispenses bonding material on the printing bed to bond the building powder on the printing bed into a bonded powder layer. When the printing head module moves along a backward direction of the printing path, the building powder of the second supplying platform may be transferred onto the printing bed through the paving roller of the printing head module, and bonding material is dispensed on the printing bed through the printing head to form another bonded powder layer on the aforementioned bonded powder layer. That is to say, the 3-D printing apparatus of the disclosure may perform printing along both the forward direction and the backward direction of the printing path; therefore, the 3-D printing apparatus of the disclosure can achieve the functionality of bi-directional printing, and greatly improve the efficiency of 3-D printing.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments and, together with the description, serve to explain the principles of the disclosure.

DESCRIPTION OF THE EMBODIMENTS

Figure 1:
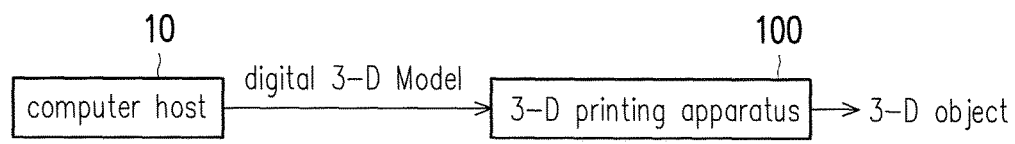
FIG. 1 is a schematic diagram of an operation environment of a 3-D printing apparatus according to an embodiment of the disclosure.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. In addition, the same reference numbers are used in the drawings and the description to refer to the same or like parts.

FIG. 1 is a schematic diagram of an operation environment of a 3-D printing apparatus according to an exemplary embodiment. In the present embodiment, a 3-D printing apparatus 100 is adapted to print a 3-D object according to a digital 3-D model. More specifically, the digital 3-D model may be a digital 3-D image file constructed by a computer host 10 by computer-aided design or animation modelling software. The 3-D printing apparatus 100 may be configured to read and process the digital 3-D model and print the 3-D object according to the digital 3-D model.

Figure 2:
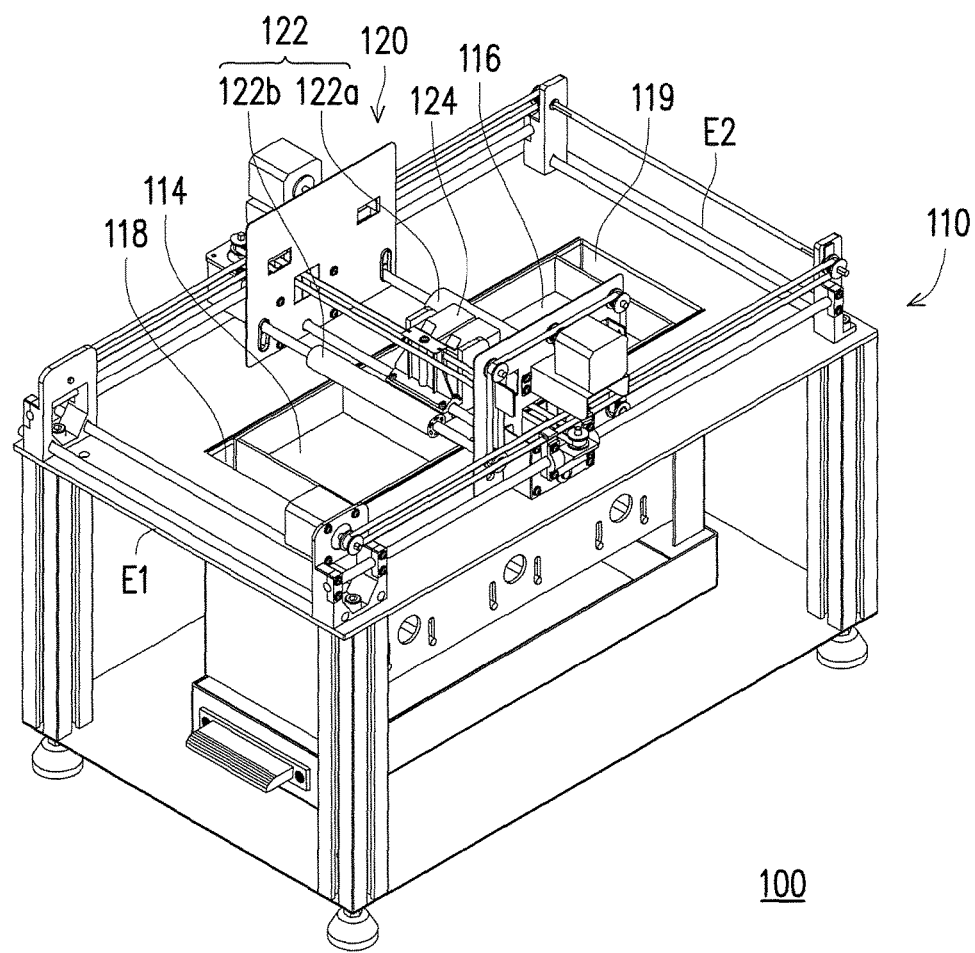
FIG. 2 is a schematic diagram of a 3-D printing apparatus according to an exemplary embodiment.
Figure 3:
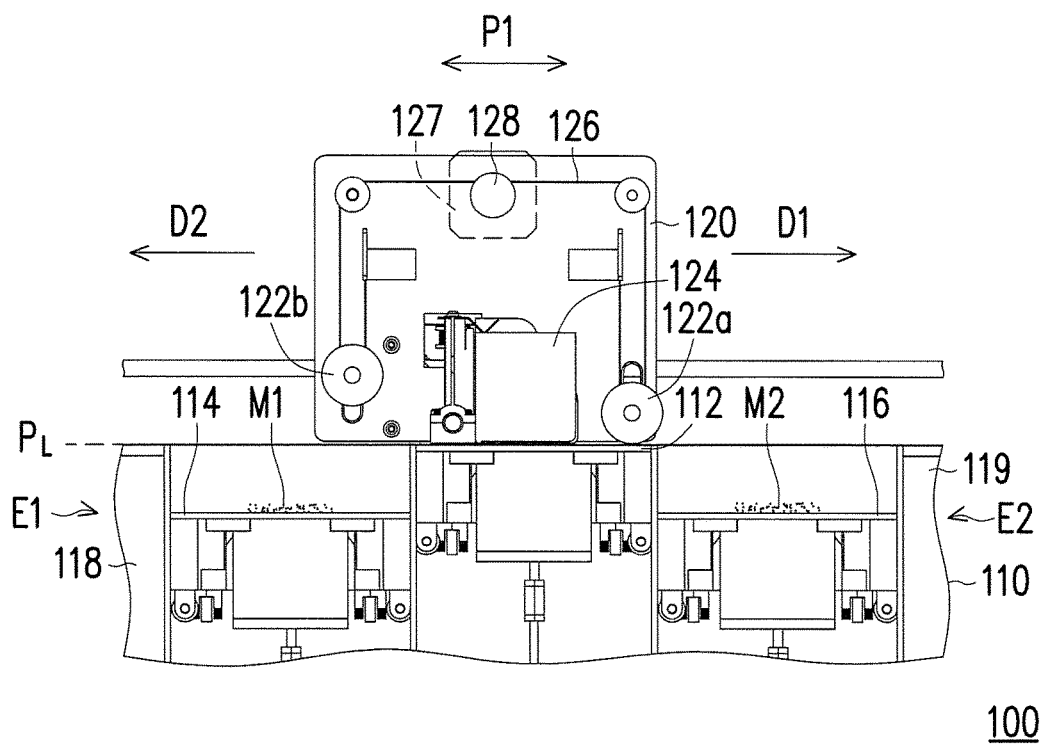
FIG. 3 is a cross-sectional schematic diagram of the 3-D printing apparatus of FIG. 2.

FIG. 2 is a schematic diagram of a 3-D printing apparatus according to an exemplary embodiment. FIG. 3 is a cross-sectional schematic diagram of the 3-D printing apparatus of FIG. 2. Referring to FIG. 2 and FIG. 3, the 3-D printing apparatus 100 includes a base 110 and a printing head module 120. The base 110 includes a printing bed 112, a first supplying platform 114 and a second supplying platform 116 disposed in order along a printing path P1. The printing bed 112 is disposed between the first supplying platform 114 and the second supplying platform 116. More specifically, the base 110 may have a first end E1 and a second end E2 opposite of each other. The first supplying platform 114 may, for example, be disposed at the first end E1 and the second supplying platform 116 may be disposed at the second end E2. The first supplying platform 114 and the second supplying platform 116 carry building powder M1, M2 respectively as shown in FIG. 3 and the first supplying platform 114 and the second supplying platform 116 are alternately lifted to the printing reference plane $P_L$ of the base 110 to alternately supply the building powder M1, M2 to the printing bed 112.

In the present embodiment, the printing head module 120 is disposed above the base 110 and is configured to move back and forth along the printing path P1. The printing head module 120 is configured to move along a forward direction D1 of the printing path P1 to transfer the building powder of the first supplying platform 114 onto the printing bed 112, and the printing head module 120 is configured to move along a backward direction D2 of the printing path P1 to transfer the building powder of the second supplying platform 116 onto the printing bed 112 to sequentially form a plurality of bonded powder layers stacked on top of each other to form the 3-D object. In the present embodiment, the printing head module 120 may include at least one paving roller 122 and at least one printing head 124. More specifically, the 3-D printing apparatus 100 may control the printing head 124 to make movements parallel to the X direction or the Y direction of the printing-reference plane $P_L$. The paving roller 122 is configured to roll forward along the printing path P1 such that the printing head module 120 moves along the forward direction D1 as shown in FIG. 3 for transferring the building powder M1 of the first supplying platform 114 onto the printing bed 112, and roll backward along the printing path P1 such that the printing head module 120 moves along the backward direction D2 as shown in FIG. 3 for transferring the building powder M2 of the second supplying platform 116 onto the printing bed 112. The printing head 124 is configured to dispense bonding material on the printing bed 112 layer by layer according to the digital 3-D model to bond the building powder M1, M2 on the printing bed 112 layer by layer, so as to form a plurality of building powder layers. The building powder layers are stacked on top of each other to form the 3-D object. In addition, the base may further include a first recycle tank 118 and a second recycle tank 119 to recycle the remaining building powder M1, M2 after every time the printing motion completes. The first supplying platform 114 is located between the printing bed 112 and the first recycle tank 118, and the second supplying platform 116 is located between the printing bed 112 and the second recycle tank 119.

More specifically, the printing head module 120 of the present embodiment includes the printing head 124, a first paving roller 122a and a second paving roller 122b. The printing head 124 is arranged to dispense bonding material on the printing bed 112 layer by layer according to the above mentioned digital 3-D model to bond the building powder M1, M2 transferred onto the printing bed 112 layer by layer to form bonded powder layers stacked on top of each other. More specifically, the first paving roller 122a as shown in FIG. 3 may be disposed in a liftable and descendible manner at a side of the printing head 124 facing the second end E2. The second paving roller 122b may be disposed in a liftable and descendible manner at a side of the printing head 124 facing the first end E1. In this arrangement, when printing starts, the printing head module 120, for example, is originally located at the first end E1 of the base 110, and the first supplying platform 114 is first lifted to the printing-reference plane $P_L$ while the first paving roller 122a is descended to the printing-reference plane $P_L$ and rolled along the forward direction D1 of the printing path P1 to evenly transfer the building powder M1 of the first supplying platform 114 onto the printing bed 112 through the rolling of the first paving roller 122a. The printing head 124 then dispenses bonding material on the printing bed 112 while moving according to the digital 3-D model to bond the building powder M1 on the printing bed 112, so as to form a bonded powder layer.

Next, the printing head module 120 continues to moves forward and moves to the second end E2 to move the remaining building powder M1 to the second recycle tank 119. At the time, the printing bed 112 is descended and moved away from the printing-reference plane $P_L$ such that the upper surface of the uppermost layer of the bonded powder layers is coplanar with the printing-reference plane $P_L$ to continue to perform printing on the above mentioned upper surface of the bonded powder layers. At the same time, the first supplying platform 114 is descended and the second supplying platform 116 is lifted to the printing-reference plane $P_L$, and the first paving roller 122a is lifted upward and the second paving roller 122b is descended to the printing-reference plane $P_L$ and rolled along the backward direction D2 of the printing path P1 to evenly transfer the building powder M2 of the second supplying platform 116 onto the printing bed 112 through the rolling of the second paving roller 122b. Next, the printing head 124 then again dispenses bonding material on the printing bed 112 while moving according to the digital 3-D model to bond the building powder M2 on the printing bed 112, so as to form another bonded powder layer. By repeating the above mentioned steps, a plurality of bonded powder layers may be formed on the printing bed 112, and the above mentioned bonded powder layers may be stacked on top of each other to form a 3-D object relating to the digital 3-D model. In this way, the 3-D printing apparatus 100 may perform printing when moving along both the forward direction D1 and the backward direction D2 of the printing path P1, which greatly increases the efficiency of 3-D printing.

Figure 4:
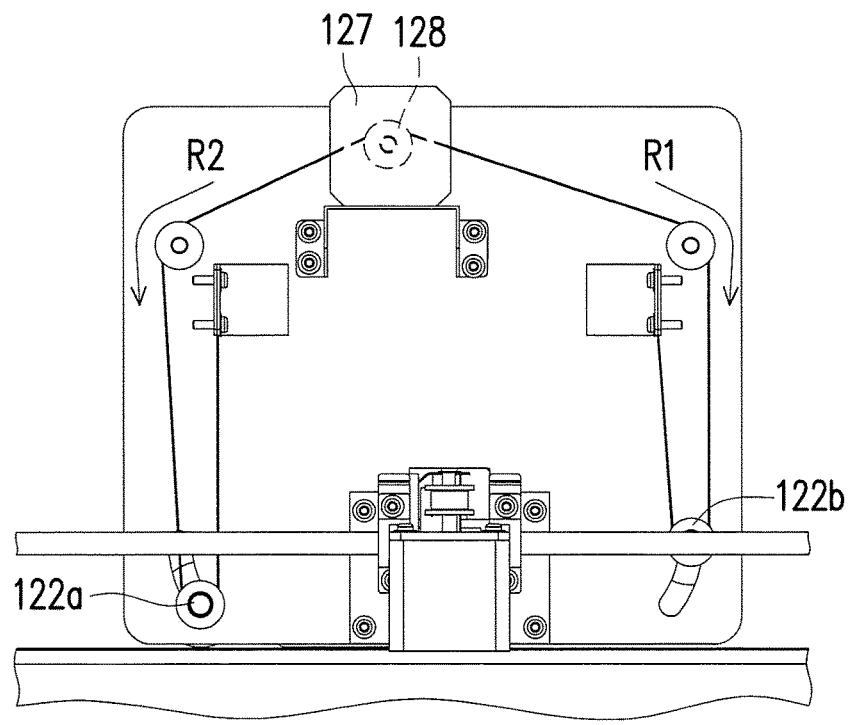
FIG. 4 is a partial exploded schematic diagram of the 3-D printing apparatus of FIG. 2.

FIG. 4 is a partial exploded schematic diagram of the 3-D printing apparatus of FIG. 2. Referring to FIG. 4, more specifically, the printing head module 120 may further include a transmission belt 126, a driving motor 127 and a driving roller 128 as shown in FIG. 4. The transmission belt 126 wraps around the first paving roller 122a and the second paving roller 122b respectively. The driving motor 127 is coupled with the driving roller 128 to drive the driving roller 128 to rotate. The driving roller 128 is configured to drive the transmission belt 126 to rotate along a first direction R1 and a second direction R2. In this way, when the printing head module 120 moves along the forward direction D1 of the printing path P1 to perform printing, the driving roller 128 drives the transmission belt 126 to rotate along the first direction R1, so as to drive the first paving roller 122a to descend to the printing-reference plane $P_L$ and lift the second paving roller 122b. When the printing head module 120 moves along the backward direction D2 of the printing direction P1 to perform printing, the driving roller 128 drives the transmission belt 126 to rotate along the second direction R2, so as to drive the second paving roller 122b to descend to the printing-reference plane $P_L$ and lift the first paving roller 122a.

Figure 5:
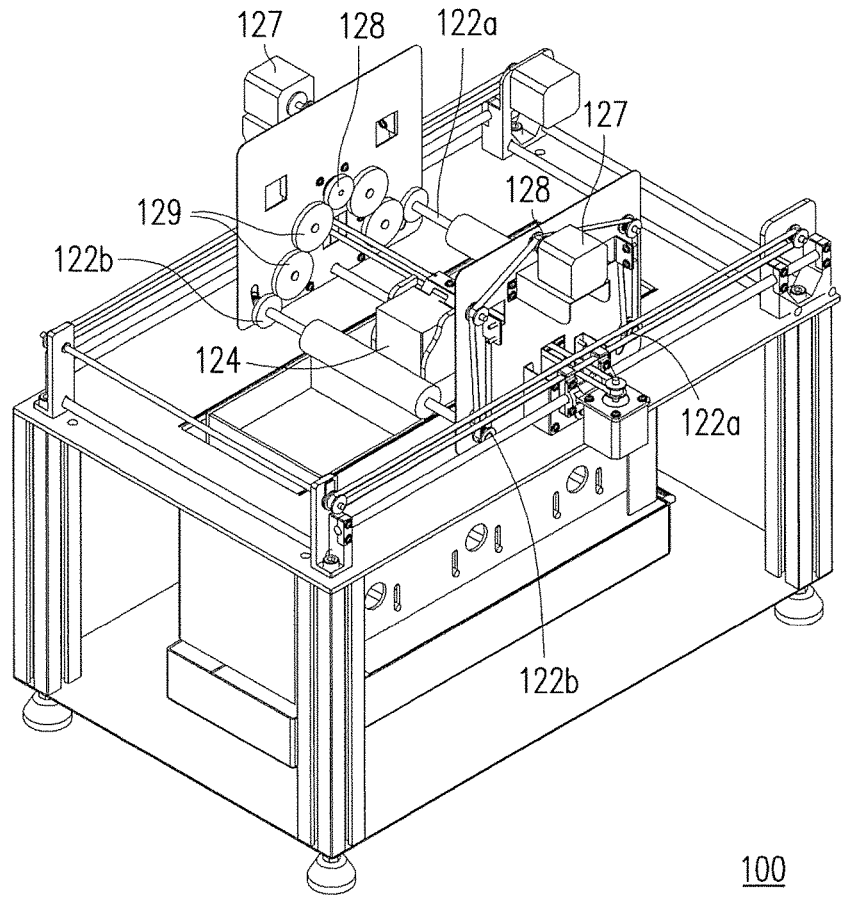
FIG. 5 is another partial exploded schematic diagram of the 3-D printing apparatus of FIG. 2.

FIG. 5 is another partial exploded schematic diagram of the 3-D printing apparatus of FIG. 2. Referring to FIG. 5, in the present embodiment, the printing head module 120 further includes a plurality of transmission rollers 129, disposed between the driving roller 128 and the first paving roller 122a and between the driving roller 128 and the second paving roller 122b respectively. The transmission rollers 129 are configured to drive the first paving roller 122a and the second paving roller 122b to rotate respectively through the driving of the driving roller 128. That is to say, the 3-D printing apparatus 100 of the present embodiment controls the lifting and descending of the first paving roller 122a and the second paving roller 122b by the cooperation of the driving roller 128 and the transmission belt 126, and controls the rotation of the first paving roller 122a and the second paving roller 122b through the engagement between the driving roller 128 and the transmission rollers 129, so as to achieve the functionality of bi-directional printing.

Figure 6:
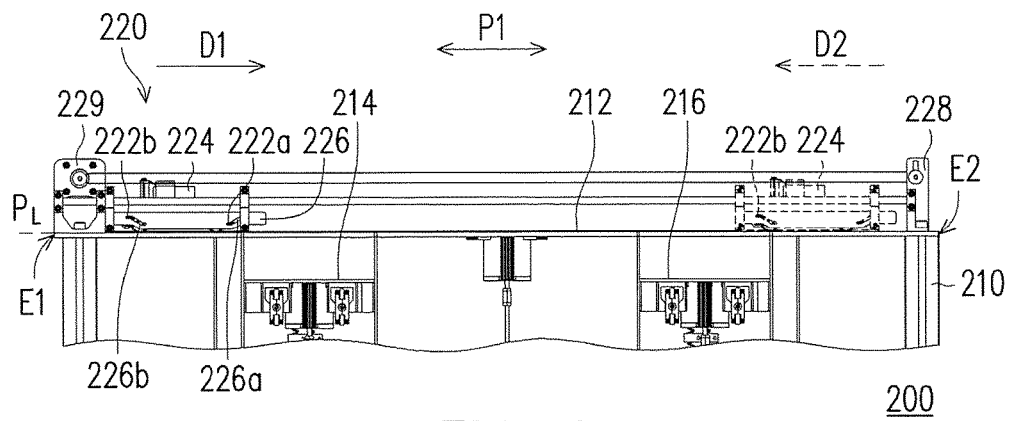
FIG. 6 is a cross-sectional schematic diagram of a 3-D printing apparatus according to an exemplary embodiment.
Figure 7:
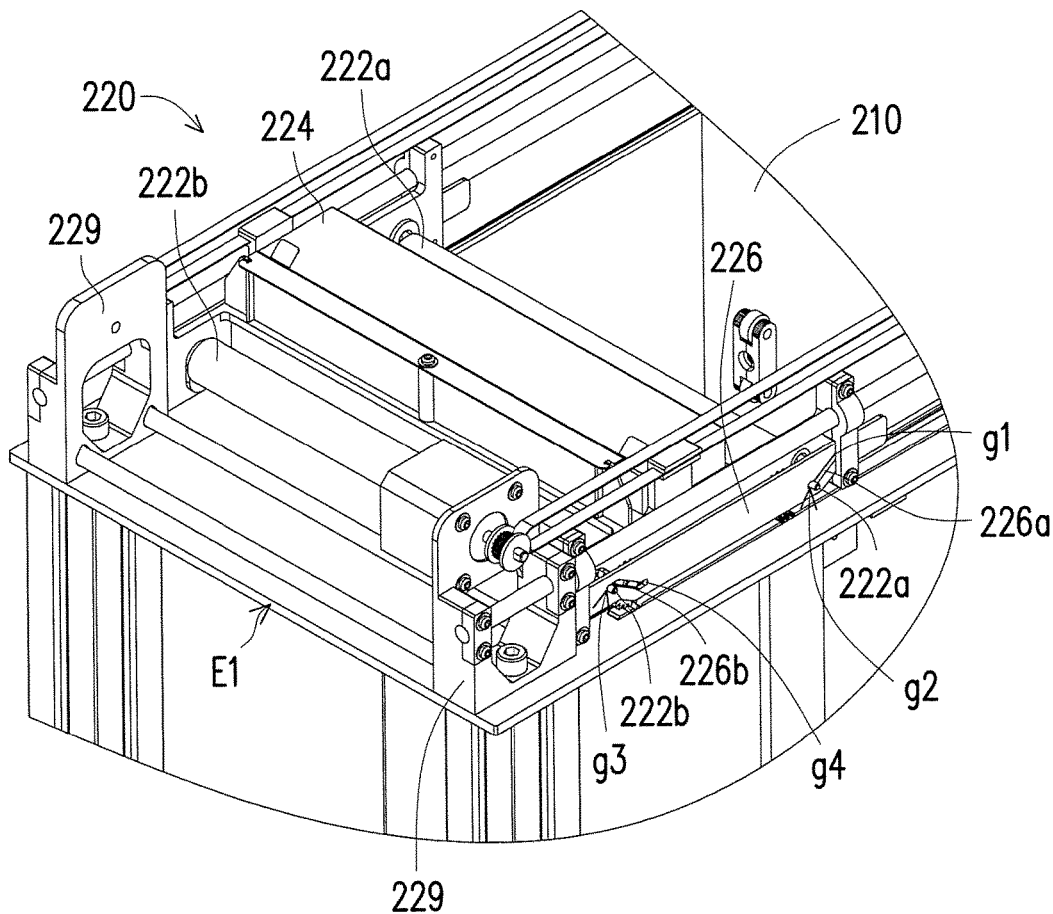
FIG. 7 is a partial exploded schematic diagram of the 3-D printing apparatus of FIG. 6.

FIG. 6 is a cross-sectional schematic diagram of a 3-D printing apparatus according to an exemplary embodiment. FIG. 7 is a partial exploded schematic diagram of the 3-D printing apparatus of FIG. 6. It should be noted that a 3-D printing apparatus 200 of the present embodiment is similar to the aforementioned 3-D printing apparatus 100; therefore, partial content from the aforementioned embodiment is adopted in the present embodiment and description of the same technical content is omitted. In regards to description of the parts omitted, reference may be made to the aforementioned embodiment and will not be repeated in the present embodiment. Referring to FIG. 6 and FIG. 7, the difference between the 3-D printing apparatus 200 of the present embodiment and the aforementioned 3-D printing apparatus 100 is described below.

In the present embodiment, similar to the 3-D printing apparatus 100, a printing head module 220 includes a printing head 224, a first paving roller 222a and a second paving roller 222b. The printing head module 220 of the present embodiment includes two linking bars 226, disposed at two opposite ends of the first paving roller 222a and the second paving roller 222b respectively, as shown in FIG. 7. Each linking bar 226 includes a plurality of guiding grooves 226a and 226b. The first paving roller 222a and the second paving roller 222b are disposed in the guiding grooves 226a, 226b respectively, and are lifted or descended through the guidance of the guiding groove 226a, 226b.

More specifically, the guiding grooves include a first guiding groove 226a and a second guiding groove 226b. Each of the first guiding groove 226a includes a first lifting end g1 relatively closer to an end of the corresponding linking bar 226, and a first guiding end g2 relatively away from the end of the corresponding linking bar 226. Each of the first guiding groove 226a is extended from the first guiding end g2 along a direction away from the printing-reference plane $P_L$ to the first lifting end g1. Two opposite ends of the first paving roller 222a are respectively disposed in the two first guiding grooves 226a located at two opposite sides of the base 210, so as to be lifted to the first lifting end g1 or descended to the first guiding end g2 through the guidance of the first guiding groove 226a. Similarly, each of the second guiding groove 226b includes a second lifting end g3 relatively closer to an end of the corresponding linking bar 226 and a second guiding end g4 relatively away from the end of the corresponding linking bar 226. Each of the second guiding groove 226b is extended from the second guiding end g4 along a direction away from the printing-reference plane $P_L$ to the second lifting end g3. Two opposite ends of the second paving roller 222b are respectively disposed in the two second guiding grooves 226b located at two opposite sides of the base 210, so as to be lifted to the second lifting end g3 or descended to the second guiding end g4 through the guidance of the second guiding groove 226b.

More specifically, in the present embodiment, the base 210 may further include a first blocking wall 228 and a second blocking wall 229. The first blocking wall 228 is disposed at the second end E2 of the base 210 and the second blocking wall 229 is disposed at the first end E1 of the base 210. With this arrangement, when printing starts, the first paving roller 222a is located at the printing-reference plane $P_L$ and rolls along the forward direction D1 of the printing path to evenly transfer the building powder M1 of a first supplying platform 214 onto a printing bed 212, and then performs printing by the printing head 224. Then, the printing head module 220 continues to move along the forward direction D1 till it contacts the first blocking wall 228, the first paving roller 222a is lifted from the first guiding end g2 to the first lifting end g1, and the second paving roller 222b is descended from the second lifting end g3 to the second guiding end g4 and located at the printing-reference plane $P_L$.

Then, the printing head module 220 is moved in the backward direction D2 along the printing path P1 to evenly transfer the building powder M2 of the second supplying platform 216 onto the printing bed 212 through the second paving roller 222b located on the printing-reference plane $P_L$, and then performs printing through the printing head 224. Next, the printing head module 220 continues to be moved along the backward direction D2 until it contacts the second blocking wall 229, the second paving roller 222b is then lifted from the second guiding end g4 to the second lifting end g3, and the first paving roller 222a is descended from the first lifting end g1 to the first guiding end g2 and located at the printing-reference plane $P_L$ to prepare to perform paving for the next print. In this way, the 3-D printing apparatus 200 can perform printing when moving along both the forward direction D1 and the backward direction D2 of the printing path P1, which greatly increases the efficiency of 3-D printing.

Figure 8:
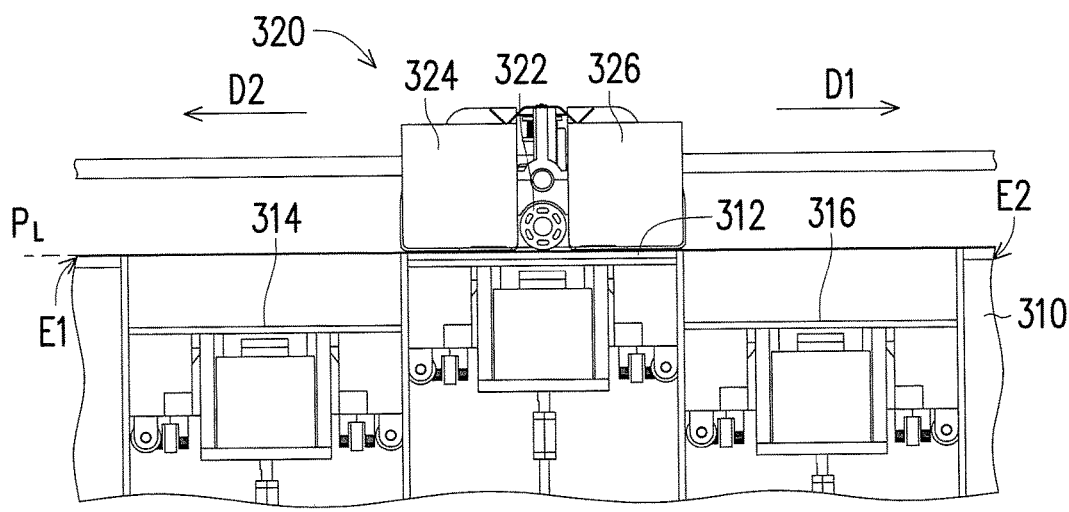
FIG. 8 is a cross-sectional schematic diagram of a 3-D printing apparatus according to an exemplary embodiment.
Figure 9:
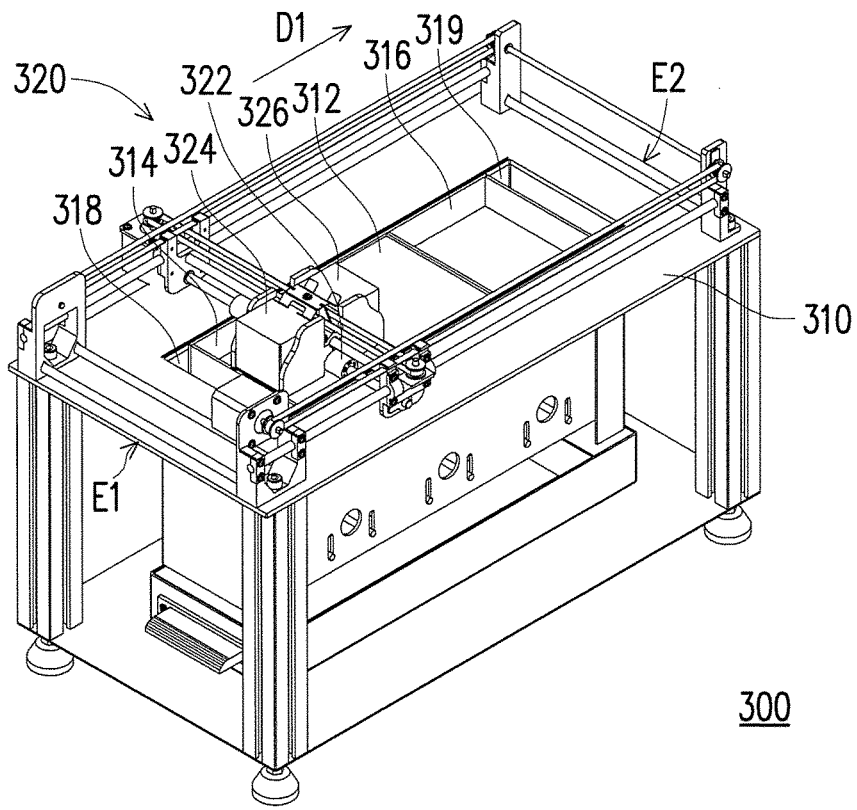
FIG. 9 is a schematic diagram of a forward print of the 3-D printing apparatus of FIG. 8.
Figure 10:
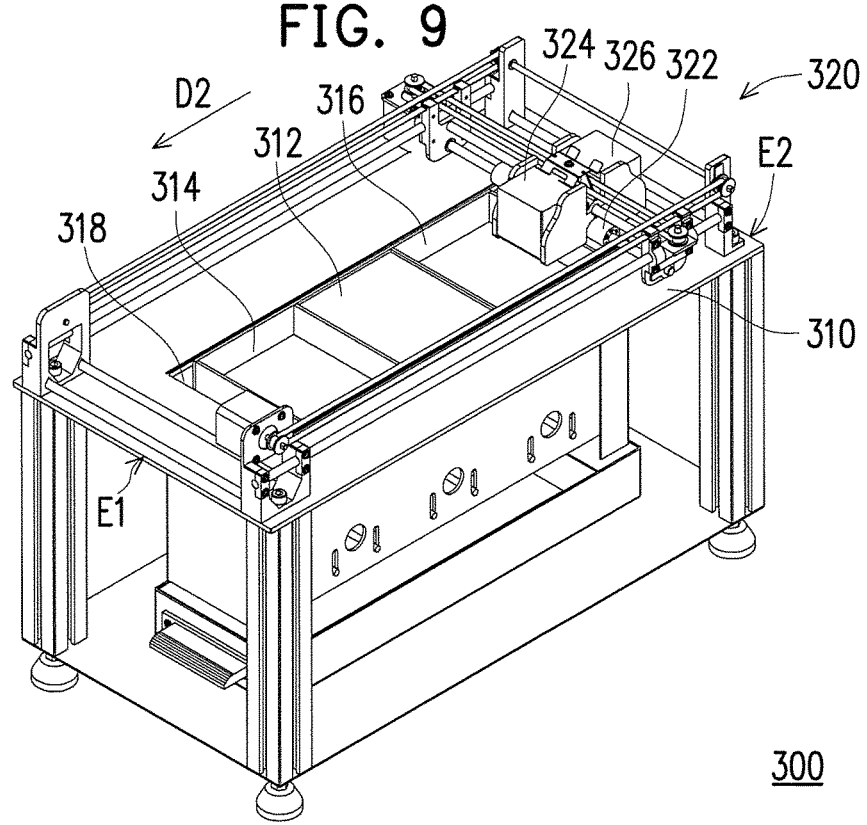
FIG. 10 is a schematic diagram of a backward print of the 3-D printing apparatus of FIG. 8.

FIG. 8 is a cross-sectional schematic diagram of a 3-D printing apparatus according to an exemplary embodiment. FIG. 9 is a schematic diagram of a forward print of the 3-D printing apparatus of FIG. 8. FIG. 10 is a schematic diagram of a backward print of the 3-D printing apparatus of FIG. 8. It should be noted that a 3-D printing apparatus 300 of the present embodiment is similar to the aforementioned 3-D printing apparatus 100; therefore, partial content from the aforementioned embodiment is adopted in the present embodiment and description of the same technical content is omitted. In regards to description of the parts omitted, reference may be made to the aforementioned embodiment and will not be repeated in the present embodiment. Referring to FIG. 8 and FIG. 10, the difference between the 3-D printing apparatus 300 of the present embodiment and the aforementioned 3-D printing apparatus 100 is described below.

In the present embodiment, a printing head module 320 of the 3-D printing apparatus 300 includes a paving roller 322, a first printing head 324 and a second printing head 326. The paving roller 322 is configured to transfer the building powder M1, M2 of the first supplying platform 314 and the second supplying platform 316 onto the printing bed 312. More specifically, the first printing head 324 is disposed at a side of the paving roller 322 facing the first end E1 of the base 310, and the second printing head 326 is disposed at a side of the paving roller 322 facing the second side E2 of the base 310. With this arrangement, when printing starts, the printing head module 320 is originally located at, for example, the first end E1 of the base 310, the first supplying platform 314 is firstly lifted to the printing-reference plane $P_L$, and the paving roller 322 rolls along the forward direction D1 of the printing path to transfer the building powder of the first supplying platform 314 onto the printing bed 312. Next, the first printing head 324 dispenses bonding material on the printing bed 312 while moving according to the digital 3-D model, to bond the building powder on the printing bed 312, so as to form a bonded powder layer.

Next, the printing head module 320 continues to move forward and move to the second end E2 to move the remaining building powder to the second recycle tank 319. Here, the printing bed 312 is descended such that the upper surface of the uppermost layer of the bonded powder layer is coplanar with the printing-reference plane $P_L$, so that the printing head module 320 is able to continue to perform printing on the above mentioned upper surface of the bonded powder layer. At the same time, the first supplying platform 314 is descended and the second supplying platform 316 is lifted to the printing-reference plane $P_L$, and the paving roller 322 is rolled along the backward direction D2 of the printing path to transfer the building powder of the second supplying platform 316 onto the printing bed 312. Next, the second printing head 326 is dispensed the bonding material on the printing bed 312 while moving according to the digital 3-D model to form a new bonded powder layer on top of the previous bonded powder layer. By repeating the above mentioned steps, a plurality of bonded powder layers may be formed on the printing bed 312, and the above mentioned bonded powder layers are stacked on top of each other to form a 3-D object relating to a digital 3-D model. In this way, the 3-D printing apparatus 300 can perform printing when moving along both the forward direction D1 and the backward direction D2 of the printing path, which greatly increases the efficiency of 3-D printing.

In summary, in the disclosure, a base of a 3-D printing apparatus has a first supplying platform and a second supplying platform disposed at two opposite sides of a printing bed, in which the first supplying platform and the second supplying platform are alternately lifted to a printing-reference plane to alternately supply building powder to the printing bed. In addition, the 3-D printing apparatus of the disclosure further performs printing by the printing head module including two paving rollers with a printing head or a paving roller with two printing heads.

With this arrangement, when the printing head module moves along a forward direction of a printing path, building powder of the first supplying platform may be transferred onto the printing bed through the paving roller of the printing head module, the printing head then dispenses bonding material on the printing bed to bond the building powder on the printing bed, so as to form a bonded powder layer. When the printing head module moves along a backward direction of the printing path, building powder of the second supplying platform is transferred onto the printing bed through the paving roller of the printing head module, and bonding material is dispensed on the printing bed through the printing head to form another bonded powder layer on the aforementioned bonded powder layer. That is to say, the 3-D printing apparatus of the disclosure can perform printing along both the forward direction and the backward direction of the printing path. Therefore, the 3-D printing apparatus of the disclosure can achieve the functionality of bi-directional printing, which greatly increases the efficiency of 3-D printing.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A 3-D printing apparatus, adapted for printing a 3-D object according to a digital 3-D model, comprising:
a base, comprising a printing bed, a first supplying platform, a second supplying platform arranged along a printing path, the printing bed disposed between the first supplying platform and the second supplying platform, the first supplying platform and the second supplying platform carry building powder to supply the building powder to the printing bed; and
a printing head module, disposed above the base and comprising at least one printing head, two linking bars, a first paving roller and a second paving roller, the first paving roller and the second paving roller disposed in a movable manner at two opposite sides of the printing head for rolling along the forward direction and the backward direction to transfer the building powder of the first supplying platform and the second supplying platform onto the printing bed alternately, the printing head configured to move along with the first paving roller and the second paving roller and dispense bonding material on the printing bed by layers according to the digital 3-D model, the two linking bars disposed at two opposite ends of the first paving roller and the second paving roller respectively, each of the linking bars including a plurality of guiding grooves, the first paving roller and the second paving roller disposed in the guiding grooves respectively, and the first paving roller and the second paving roller being lifted or descended through guidance of the guiding grooves, so as to bond the building powder transferred onto the printing bed by layers, to sequentially form a plurality of bonded powder layers stacked on top of each other to form the 3-D object.

2. The 3-D printing apparatus as claimed in claim 1, wherein the base further comprises a first end and a second end opposite of each other, the first supplying platform is disposed at the first end and the second supplying platform is disposed at the second end.

3. The 3-D printing apparatus as claimed in claim 2, wherein the base further comprises a first recycle tank and a second recycle tank to recycle remaining building powder, the first supplying platform is located between the printing bed and the first recycle tank and the second supplying platform is located between the printing bed and the second recycle tank.

4. The 3-D printing apparatus as claimed in claim 2,
wherein the first paving roller, disposed in a liftable and descendible manner at a side of the printing head facing the second end, when the first supplying platform is lifted to a printing-reference plane, the first paving roller is descended to the printing-reference plane and rolled along the forward direction to transfer the building powder of the first supplying platform onto the printing bed; and
the second paving roller, disposed in a liftable and descendible manner at a side of the printing head facing the first end, when the second supplying platform is lifted to the printing-reference plane, the second paving roller is descended to the printing-reference plane, and rolled along the backward direction to transfer the building powder of the second supplying platform onto the printing bed.

5. The 3-D printing apparatus as claimed in claim 1, wherein the guiding grooves comprises:
a first guiding groove, comprising a first lifting end relatively closer to an end of the each linking bar and a first guiding end relatively away from the end of corresponding linking bar, the first guiding groove is extended from the first guiding end along a direction away from the printing-reference plane to the first lifting end, two opposite ends of each linking bar are located in two of the first guiding grooves respectively, to be lifted to the first lifting end or descend to the first guiding end through guidance of the first guiding groove; and
a second guiding groove, comprising a second lifting end relatively closer to other end of each linking bar and a second guiding end relatively away from the other end of each linking bar, the second guiding groove is extended from the second guiding end along a direction away from the printing-reference plane to the second lifting end, two opposite ends of the second paving roller are located in two of the second guiding grooves respectively, so as to be lifted to the second lifting end or descended to the second guiding end through guidance of the second guiding groove.

6. The 3-D printing apparatus as claimed in claim 5, wherein the base further comprises:
a first blocking wall, disposed at the second end, when the printing head module moves forward along the printing path till contacts the first blocking wall, the first paving roller is lifted from the first guiding end to the first lifting end, the second paving roller is descended from the second lifting end to the second guiding end; and
a second blocking wall, disposed at the first end, when the printing head module moves backward along the printing path till contacts the second blocking wall, the first paving roller is descended from the first lifting end to the first guiding end, the second paving roller is lifted from the second guiding end to the second lifting end.

7. The 3-D printing apparatus as claimed in claim 1, wherein the printing bed is configured to move along a direction away from the printing-reference plane layer by layer, such that an upper surface of an uppermost layer of the bonding powder layers is coplanar with the printing-reference plane.

* * * * *